United States Patent
Yochai (10) Patent No.: US 9,798,665 B1
(45) Date of Patent: Oct. 24, 2017

(54) CACHE EVICTION ACCORDING TO DATA HIT RATIO AND SERVICE LEVEL AGREEMENT

(71) Applicant: Infinidat LTD., Herzliya (IL)

(72) Inventor: Yechiel Yochai, Moshav Aviel (IL)

(73) Assignee: INFINIDAT LTD., Herzliya (IL)

(\*) Notice: Subject to any disclaimer, the term of this patent is extended or adjusted under 35 U.S.C. 154(b) by 45 days.

(21) Appl. No.: 14/975,794

(22) Filed: Dec. 20, 2015

(51) Int. Cl.
- *G06F 12/00* (2006.01)
- *G06F 12/0831* (2016.01)
- *G06F 12/0891* (2016.01)

(52) U.S. Cl.
CPC ...... *G06F 12/0833* (2013.01); *G06F 12/0891* (2013.01); *G06F 2212/621* (2013.01)

(58) Field of Classification Search
CPC ............. G06F 12/0833; G06F 12/0891; G06F 12/0815; G06F 12/0817; G06F 12/082; G06F 12/0822; G06F 12/0824; G06F 12/0826; G06F 12/0828; G06F 12/0831; G06F 2212/621
USPC .................................................. 711/118–146
See application file for complete search history.

(56) References Cited

U.S. PATENT DOCUMENTS

| | | | | |
|---|---|---|---|---|
| 5,619,676 A * | 4/1997 | Fukuda | ............... | G06F 12/0862 711/128 |
| 7,694,075 B1 * | 4/2010 | Feekes, Jr. | .......... | G06F 12/0888 711/119 |
| 2003/0212870 A1 * | 11/2003 | Nowakowski | ...... | G06F 11/2082 711/162 |
| 2003/0229759 A1 * | 12/2003 | Doyle | ................. | G06F 12/0866 711/133 |
| 2007/0061446 A1 * | 3/2007 | Matsuo | ................... | G06F 3/061 709/224 |
| 2012/0221774 A1 * | 8/2012 | Atkisson | ............. | G06F 12/0802 711/103 |
| 2013/0073806 A1 * | 3/2013 | Xavier | ................ | G06F 11/3485 711/114 |
| 2013/0138891 A1 * | 5/2013 | Chockler | .............. | G06F 9/5016 711/133 |
| 2013/0275669 A1 * | 10/2013 | Naga | ................... | G06F 12/0866 711/113 |
| 2014/0129779 A1 * | 5/2014 | Frachtenberg | ........ | G06F 12/123 711/136 |
| 2015/0339167 A1 * | 11/2015 | Takeuchi | .............. | G06F 9/5077 718/1 |
| 2016/0072910 A1 * | 3/2016 | Eicher | ................. | H04L 67/2842 709/213 |
| 2016/0077974 A1 * | 3/2016 | Kim | .................... | G06F 12/0804 711/135 |

\* cited by examiner

*Primary Examiner* — Tuan Thai
*Assistant Examiner* — Tasnima Matin
(74) *Attorney, Agent, or Firm* — Reches Patents (57) ABSTRACT

A method that may include determining, for each user of a group of users, a time difference between an event of a first type that is related to a storage of a user data unit of the user within a cache of a storage system and to an eviction of the user data unit from the cache, in response to (a) a service-level agreement (SLA) associated with the user and to (b) multiple data hit ratios associated with multiple different values of a time difference between events of the first type and evictions, from the cache, of multiple user data units of the user; and evicting from the cache, based upon the determination, one or more user data units associated with one or more users of the group.

24 Claims, 4 Drawing Sheets

CACHE EVICTION ACCORDING TO DATA HIT RATIO AND SERVICE LEVEL AGREEMENT

BACKGROUND

A service-level agreement (SLA) between a storage system and a storage user defines the quality of service (QoS) that is guaranteed to the storage user and particulariy defines the performance, such as: response time, number of I/O operations per second (IOPS), and throughput (megabytes per second).

The ability of the storage system to provide certain levels of performance depends on the hardware being used and the manner in which the hardware is utilized.

One example of hardware utilization that can have a dramatic impact on the performance is using a cache memory for storing mostly used data. When data requested to be read is found in the cache (cache hit), the response time is almost instantaneous. When the data requested to be read is not found in the cache (cache miss), the data is read from a storage drive, which is much slower than the cache and thus the response time, when reading from the storage drive, is significantly longer than the response time of requests that are served from the cache.

Hit ratio is a term that defines the percentage of I/O requests served from the cache comparing to the total served I/O requests.

During a cache miss, the data that is read from the slower storage drive is usually placed in the cache, since this data is likely to be requested by subsequent requests. Since cache memories are relatively small, there is usually a need to evict other data before caching the data that was just read.

The technique used to select the data to be evicted is known as "replacement policy". A popular replacement policy is called "least recently used" (LRU), where the least recently used data is evicted first.

Various techniques allow data associated with SLAs of higher levels to be cached longer than data of lower level SLAs. However, there is no guarantee that the longer cached data will improve the performance, as the performance also depends on the access pattern of the specific storage user. For example, if newly cached data is used by a specific storage user only in the first few minutes after the first request to read the data, then caching the data for extra two hours will not improve the performance for this specific storage user, and can further degrade the performance of other users, that need longer caching and could use the wasted cache space.

When different SLAs are employed and assigned to storage users with different access patterns, there is a need to define the duration of data caching, per storage user, in accordance with the access pattern of the storage user and the SLA assigned to the storage user.

SUMMARY

According to an embodiment of the invention there may be provided a method that may include determining, for each user of a group of users, a time difference between an event of a first type that may be related to a storage of a user data unit of the user within a cache of a storage system and to an eviction of the user data unit from the cache, in response to (a) a service-level agreement (SLA) associated with the user and to (b) multiple data hit ratios associated with multiple different values of a time difference between events of the first type and evictions, from the cache, of multiple user data units of the user; and evicting from the cache, based upon the determination, one or more user data units associated with one or more users of the group.

The event related to the storage of the user data unit may be a writing of the user data unit to the cache; and wherein the time difference may be a caching period of the user data unit; wherein the caching period of the user data unit equals a difference between a time of writing of the user data unit to the cache and the eviction of the user data unit from the cache.

The multiple data hit ratios may be facilitated by (based on, driven from) a mapping between hit ratios and ages of the multiple user data units; wherein an age of a user data unit equals a time difference between writing the user data unit to the cache and an occurrence of a cache hit related to the user data unit.

The event of the first type differs from a writing of the user data unit to the cache.

The method may include translating an SLA parameter associated with each user of the group to a desired hit ratio associated with the user data unit.

The SLA parameter associated with each user of the group defines a desired maximal response time or a minimal amount of input output operations per second.

The method may include monitoring accesses to user data units associated with a given user of the group; and calculating, in response to the monitoring, multiple data hit ratios associated with multiple different values of a time difference between events of the first type related to the given user and evictions, from the cache, of multiple user data units of the given user.

The method may include monitoring accesses to user data units associated with a given user of the group at a first granularity.

The method may include changing the time difference associated with the given user at a second granularity that differs from the first granularity.

The method may include decreasing the time difference associated with the given user at the first granularity; and increasing the time difference associated with the given user by a second granularity that may be finer than the first granularity.

The determining may include: checking, for a given user of the group, whether the SLA associated with the given user will be maintained when reducing the time difference by a certain amount; preventing a reduction of the time difference by the certain amount when the SLA associated with the given user will not be maintained after the reduction; and reducing the time difference by the certain amount when the SLA associated with the given user will be maintained after the reduction.

The determining may include evaluating an increment of the time difference associated with each user of the group when the SLA associated with the user may be not maintained.

The determining may include evaluating an increment of the time difference associated with a given user of the group by increasing the time difference of only a portion of user data units of the given user that may be stored in the cache.

According to an embodiment of the invention there may be provided a non-transitory computer readable medium may store instructions that once executed by a storage system cause the storage system to execute the steps of: determining, for each user of a group of users, a time difference between an event of a first type that may be related to a storage of a user data unit of the user within a cache of a storage system and to an eviction of the user data unit from the cache, in response to (a) a service-level agreement (SLA) associated with the user and to (b) multiple data hit ratios associated with multiple different values of a time difference between events of the first type and evictions, from the cache, of multiple user data units of the user; and evicting from the cache, based upon the determination, one or more user data units associated with one or more users of the group.

The event related to the storage of the user data unit may be a writing of the user data unit to the cache; and wherein the time difference may be a caching period of the user data unit; wherein the caching period of the user data unit equals a difference between a time of writing of the user data unit to the cache and the eviction of the user data unit from the cache.

The multiple data hit ratios may be facilitated by a mapping between hit ratios and ages of the multiple user data units; wherein an age of a user data unit equals a time difference between writing the user data unit to the cache and an occurrence of a cache hit related to the user data unit.

The event of the first type differs from a writing of the user data unit to the cache.

The non-transitory computer readable medium may store instructions for translating an SLA parameter associated with each user of the group to a desired hit ratio associated with user data units of the user.

The SLA parameter associated with each user of the group defines a desired maximal response time or a minimal amount of input output operations per second.

The non-transitory computer readable medium may store instructions for monitoring accesses to user data units associated with a given user of the group; and calculating, in response to the monitoring, multiple data hit ratios associated with multiple different values of a time difference between events of the first type related to the given user and evictions, from the cache, of multiple user data units of the given user.

The non-transitory computer readable medium may store instructions for monitoring accesses to user data units associated with a given user of the group at a first granularity.

The non-transitory computer readable medium may store instructions for changing the time difference associated with the given user at a second granularity that differs from the first granularity.

The non-transitory computer readable medium may store instructions for decreasing the time difference associated with the given user at the first granularity; and increasing the time difference associated with the given user by a second granularity that may be finer than the first granularity.

The determining may include checking, for a given user of the group, whether the SLA associated with the given user will be maintained when reducing the time difference by a certain amount; preventing a reduction of the time difference by the certain amount when the SLA associated with the given user will not be maintained after the reduction; and reducing the time difference by the certain amount when the SLA associated with the given user will be maintained after the reduction.

The determining may include evaluating an increment of the time difference associated with each user of the group when the SLA associated with the user may be not maintained.

The determining may include evaluating an increment of the time difference associated with a given user of the group by increasing the time difference of only a portion of user data units of the given user that may be stored in the cache.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following system, method and non-transitory computer readable medium predict the required duration of retaining, in the cache, data associated with a specific user that is assigned with a specific SLA, for conforming to the specific SLA. The method is performed per each user of the storage users, or at least to part of the users, by collecting and analyzing, per user, measurements of hit-rate versus the age of the hit data in the cache.

The term "user data unit" may include multiple bits related to a user. The multiple bits may be an atomic unit for any operation such as caching, destaging, read and/or write operations or may differ from such an atomic unit. The term user data may refer to one or more user data units.

Figure 1:
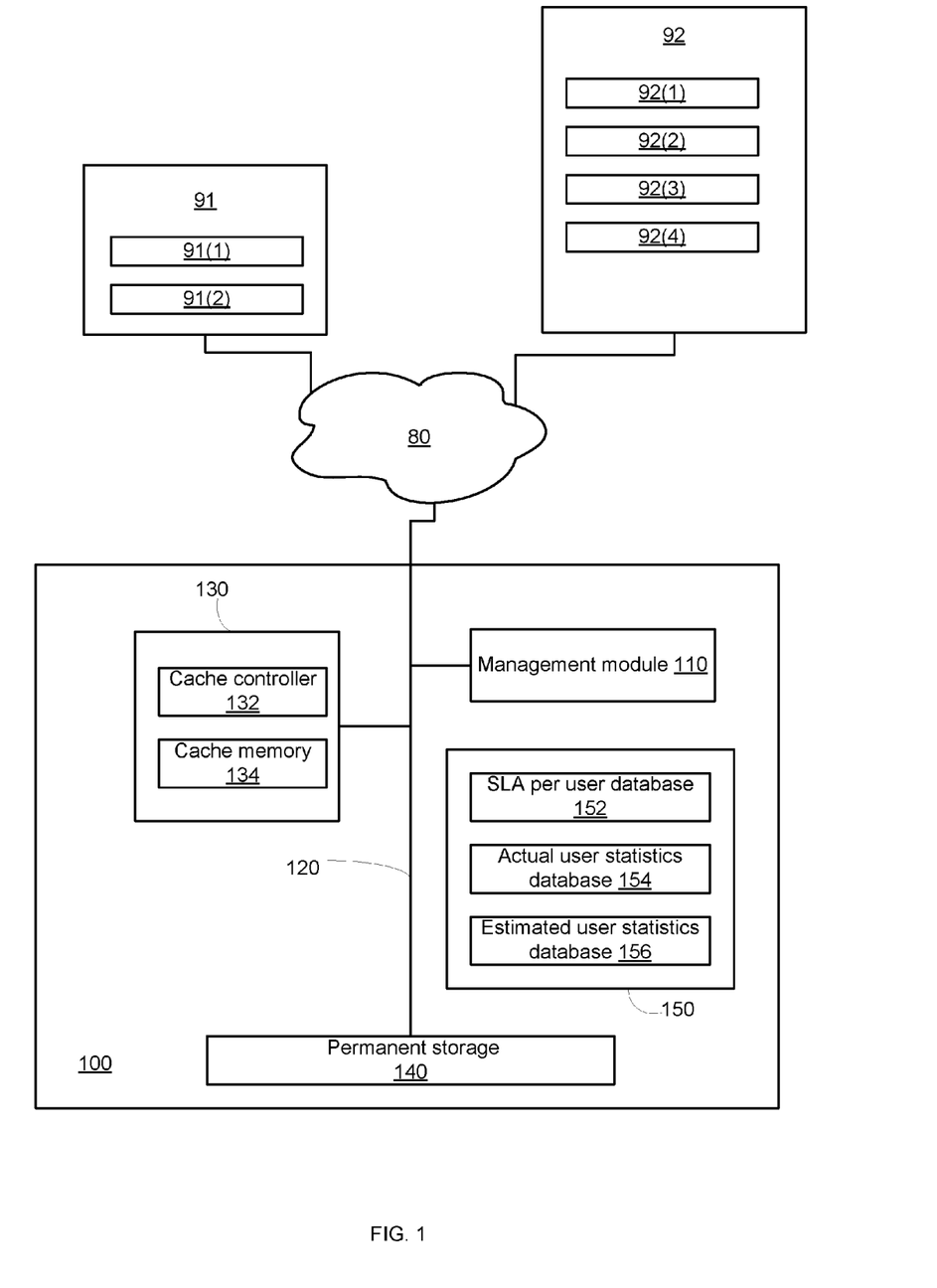
FIG. 1 illustrates a storage system and its environment according to an embodiment of the invention.

FIG. 1 illustrates storage system 100 according to an embodiment of the invention.

Storage system 100 may be accessed by multiple computerized systems 91 and 92 that are coupled to storage system 100 over network 80. The computerized systems 91 and 92 can read data from the storage system 100 and/or write data to the storage system 100.

Computerized system 91 may host multiple applications such as applications 91(1) and 91(2). Computerized system 92 may host multiple applications such as applications 92(1), 92(2), 92(3) and 92(4). Any number of computerized systems may be coupled to storage system 100 and any computerized system may host any number of applications. A user may be a person or any other accessing entity that utilizes a computerized system for accessing the storage system, such as an application running on the computerized system and accesses the storage system, or a specific computerized system such as a host server, and the like. The user data may be associated with a specific volume within the storage system, or may refer to any data initiated by the user regardless of the addressed volume.

The storage system 100 includes a management module 110, internal network 120, cache module 130, and permanent storage 140 that may include multiple disk drives and/or solid state drives.

FIG. 1 also illustrates various data structures 150 such as (i) SLA per user data base 152 for storing information about SLA per user, (ii) actual user statistics database 154 for storing information about hit ratios associated with user data of different users, and (iii) estimated user statistics database 156 for storing estimated user hit ratios.

The various data structures may be stored (fully or partially) in cache memory 134 and/or in permanent storage 140.

The management module 110 may include one or more processors and/or may be hosted by one or more processors. The management module may include at least one hardware component. The management module 110 is configured to control accesses to permanent storage 140, via e.g., SAS (Serial Attached SCSI (Small Computer System Interface)) controllers.

The cache module 130 may include a cache controller 132 and a cache memory 134. The cache memory 134 can be used to temporarily store data received from computerized systems 90(1)-90(Q) before the data is destaged to permanent storage 140 and for storing data that was read from permanent storage 140 and particularly, the most used data.

The internal network 120 facilitates communications between the permanent storage 140, the management module 110 and the cache module 130. The internal network 120 may include passive and active components such as communication links, connectors, switches, routers and the like.

It is assumed that all the data is stored in storage devices of permanent storage 140, and part of the data can also be temporally stored in cache memory 134. The cache memory 134 provides a faster access time and lower latency comparing to the access time and latency provided by the storage devices of permanent storage 140. The cache memory 134 may be a RAM or SSD.

Cache controller 132 and/or management module 110 may perform the various methods illustrated in the patent application. It is noted that the various methods may be executed by a controller that differs from cache controller 132 and management module 110 and that the controller may belong to storage system 100 or not belong to the storage system 100. For example—the monitoring of the hit ratio and accesses of a user may be executed by the cache controller 132 and/or management module 110 while the decisions relating to the caching parameters (such as caching duration) can be made by a different controller.

The storage user (also referred to as user) can be an application, host, an entity utilizing a specific storage resource handled by the storage system, any entity accessing a specific volume, or any other accessing entity.

The following embodiments describe how a maximum response time, required by an SLA, is guaranteed.

However, other performance requirements (e.g., I/O per second) can also be handled in a similar manner. The following embodiments describe handling read requests, but can be implemented to any type of access requests (write, read and write, random read, all types of read).

When an SLA is defined for a storage user of the storage system, a required hit rate that will facilitate conformance to the SLA can be calculated according to: (i) the read response time defined in the SLA, (ii) read access time of the storage devices, and (iii) read access time of reading from the cache. For example, if the read response time is defined in the SLA as 4 milliseconds, the access time of the storage devices is 15 milliseconds and the access time for reading from the cache is negligible comparing to the storage devices, then the hit rate should be 75%, i.e., 75% of the read requests should be served from the cache.

Instead of using the response time as an SLA parameter that needs to be fulfilled, other performance parameter can be used, for example: if a certain number of IOPS needs to be fulfilled, where the maximum number of IOPS supported by the storage devices of the system is x and the maximum number of IOPS supported the cache is y, then the ratio x/y can be taken into account when calculating the percentage of read requests that should be served from the cache.

In order to control the hit rate per monitored user, the following algorithms can be implemented.

For each monitored user, statistics are gathered for read requests that are served from the cache, according to the age of the data in the cache upon reading the data from the cache (cache hit). The age of the data may refer to the time elapsed since the data was read into the cache. Alternatively the age of the data may refer to any cache event related to the data that refreshed the data, e.g.: the time elapsed since the last time the data was read from the cache, the time elapsed since the last time the data was accessed (read or write), and so on. The term "eviction time" hereinafter defines the time elapsed since the cache event (e.g., the point in time when the data was read from the storage device into the cache) until the data needs to be evicted from the cache.

Figure 2:
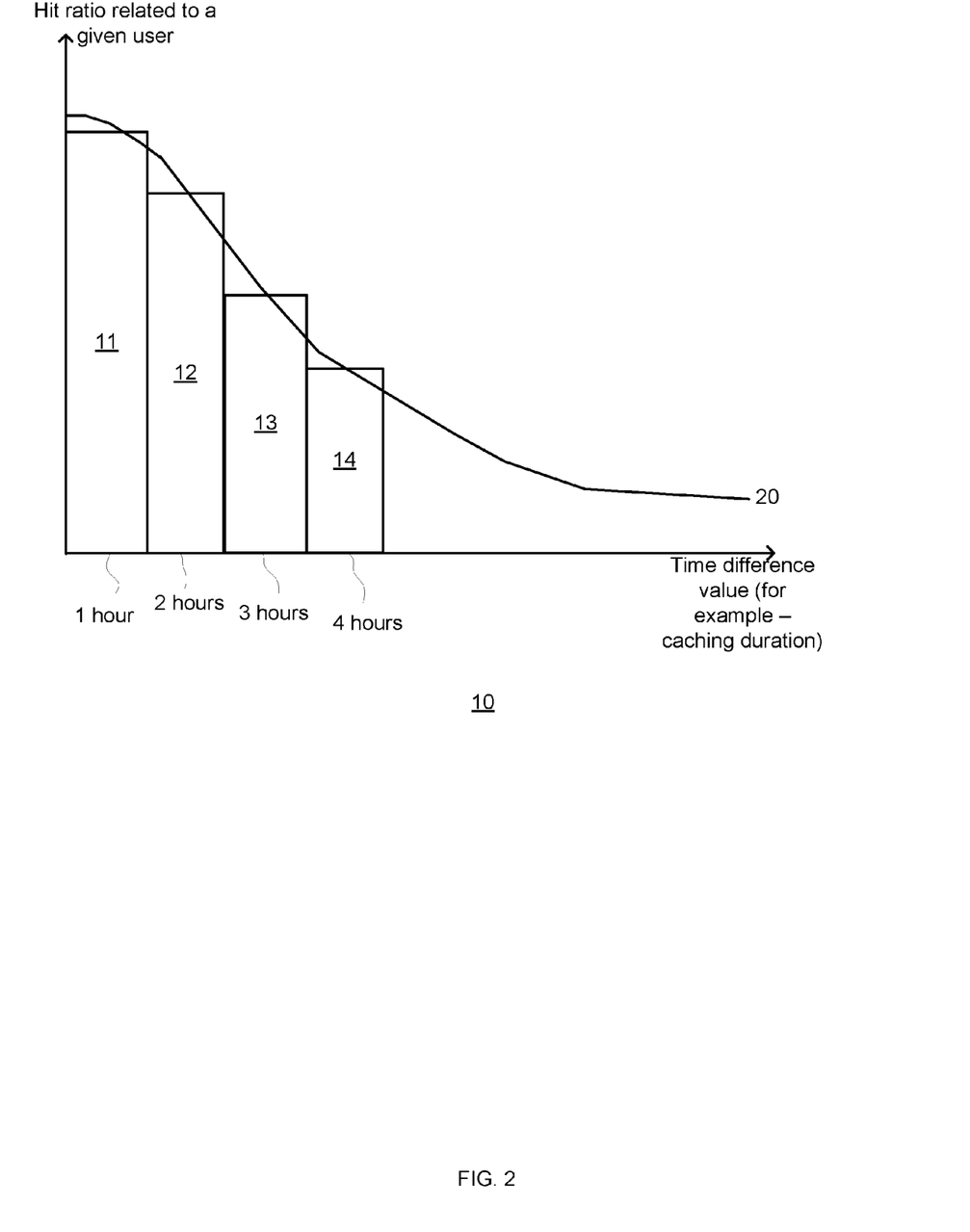
FIG. 2 illustrates hit ratio statistics of a given user according to an embodiment of the invention.
Figure 3:
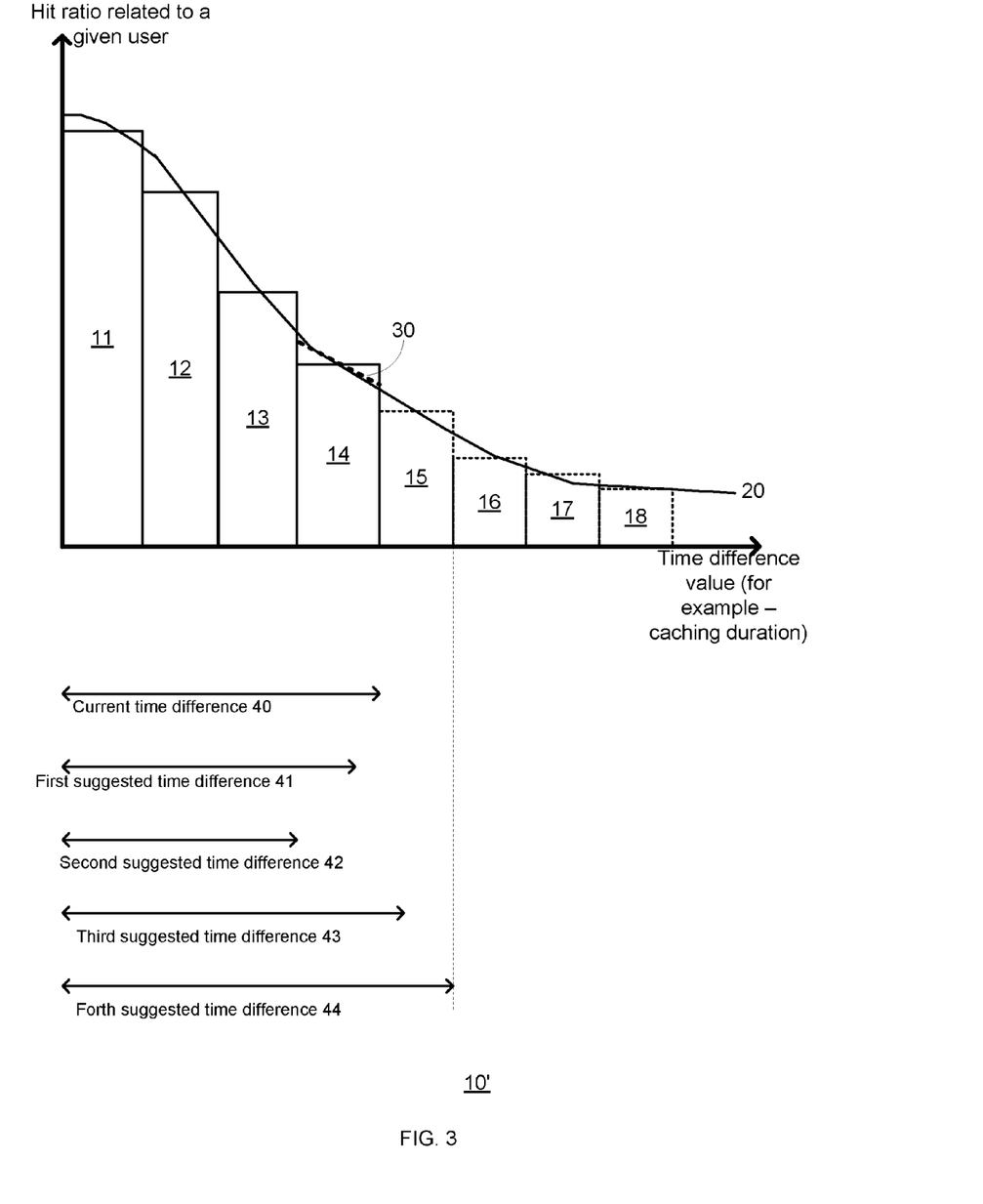
FIG. 3 illustrates hit ratio statistics of a given user and various values of a time difference according to an embodiment of the invention.

FIGS. 2 and 3 illustrate hit ratio statistics 10 and 10' of a given user according to an embodiment of the invention.

Hit ratio statistics 10 are in the form of a histogram that includes four bins (age classes) 11, 12, 13 and 14 and is indicative of the hit ratio gathered for four age classes of hit data, where each age class refers to a different age of the data in the cache when the hit occurred: one hour old data (11), two hours old data (12), three hours old data (13) and four hours old data (14). Each bin represents statistics indicative of hit ratio, for example: the number of hits of data of the certain age class. The number of hits of data of the certain age class can be divided by the total number of read requests served from either the cache or from the permanent storage. Bin 11 gather hit statistics for one hour old data, bin 12 gather hit statistics for two hour old data, etc. The data of the given user is evicted after four hours and therefore, no hit statistics are gathered for data that is older than four hours. The sum of all four bins is the total hits or hit rate for all cached data of the given user.

In FIG. 2—the hit ratio is monitored at a first granularity of one hour. This is merely an example and the monitoring may be done at a finer granularity (bins that are shorter than one hour) or at a coarser granularity (bins of more than one hour). Furthermore—the different bins may represent equal or unequal periods.

In order to obtain the hit ratio both the total accesses of the user and the hit (or miss) are gathered.

While FIG. 2 illustrates four bins, it is noted that the number of bins may exceed four and may be any number. The number of bins can match the current eviction time (e.g., four bins of one hour when the eviction time is four hours) and can be changed when it is determined to change the eviction time. The number of bins can cover a larger period than the current eviction time for purposes of estimating whether to extend the eviction time.

The collected hit ratio statistics can be normalized, according to techniques known in the art, so as to provide a moving average of the hit rate over time passed, where older samples have lower weight than newer samples, so as to adjust to the dynamic nature of the access requests.

For example, FIG. 2 may reflect statistics collected during the last one second, while similar statistics can be saved up to ten seconds behind (a set of ten time-bins) and a weighted average of the hit rate, per each class, can be calculated with different weights for different time bins.

If the overall hit rate, summed for all the monitored age classes (1-4 hours), is around the required hit rate, e.g. sums to 75% of the total served read requests, then it can be determined that the eviction time of data read by the specific user should be indeed four hours.

Nevertheless, even in the case where the overall hit rate, summed for all the monitored categories, is around the required hit rate, the contribution of one or more last age classes (e.g., the count of the four hour old data) to the required hit rate may be negligible.

Thus, it can be determined that the eviction time of the data can be reduced, e.g., to three hours, without meaningful harm to the response time (or to the required hit rate). Reducing the eviction time for a specific user can free a substantial cache space that can be used for a benefit of another user. The amount of the cache space expected to be freed can be calculated even before changing the eviction time. Assuming that the amount of data read per hour for each user (including the specific user) is known, then it can be multiplied by the fraction of the monitored classes that are to be dismissed, e.g., in this example, one of the four (1/4) of the monitored classes is dismissed.

If the hit rate, for all monitored age classes, is more than the required hit rate, the eviction time of data read by the specific user is decreased. The new eviction time can be determined by eliminating the hit rate associated with the last age classes from the overall hit rate to obtain a sufficient hit rate (around the required hit rate). For example, the contribution of the four hours class can be eliminating from the overall hit rate and if the result is round 75%, it can be determined that the eviction time should be reduced to three hours and statistics will be gathered for three age classes. If the hit rate associated with the first three classes is still above the required, then the eviction time and the number of classes can be reduced further.

In case it is determined that the eviction time can be decreased, the amount of space that will be freed can also be determined, as described above, and the freed space can be used for increasing the eviction time of other user(s).

If the total number of hits, for all monitored age classes, is less than the required hit rate, the eviction time of data read by the specific user is increased by one or more classes, e.g., to five hours and statistics will be gathered for five age classes.

Since incrementing the eviction time can affect the cached data of other users, while having negligible influence on the hit rate of the data of the specific user, the impact of incrementing the eviction time can be estimated before being fully employed.

For example, looking at curve 20 drawn by the histogram of statistics of FIG. 3, the derivative 30 of the function, at the point of the last monitored class, can be calculated. Assuming that the derivative is only slightly changed between adjacent classes, an integral can be calculated to retrieve the expected hit-rate for additional classes, for example 5-8 age classes (bins 15, 16, 17 and 18), illustrated in dashed lined, as well as the expected space consumption in the cache for handling additional classes.

The hit ratio for 5-8 age classes is not known and may be stored within estimated user statistics database 156.

The hit ratio for 1-4 age classes is known and may be stored in actual user statistics database 154.

FIG. 3 also illustrates the current time difference 40 (that correspond to the first till forth bins and represents a period of four hours), as well as first till fourth suggested time differences 41, 42, 43 and 44 that represent different outcome of the determination of the value of the time difference.

The first suggested time difference 41 is shorter than the current time difference by a fraction of an hour (smaller than the first granularity).

The second suggested time difference 42 is shorter than the current time difference by an hour (equals the first granularity). The second suggested time difference 42 can be simply determined by subtracting the count of age class 14 and checking that the hit rate after the subtracting matches the required hit rate. If after the subtracting the hit rate is below the required hit rate but the current hit rate is still well above the required hit rate, then it can be estimated that a fraction of the first granularity can be subtracted from the current time difference, to achieve time difference 41. The estimation of the fraction to be subtracted can use a linear function of the age class (e.g., half of the first granularity results half of the count of age class 14), hyperbolic function, etc.

The third suggested time difference 43 is longer than the current time difference by a fraction of an hour (smaller than the first granularity).

The fourth suggested time difference 44 is longer than the current time difference by an hour (equals the first granularity).

According to the number of additional classes that will cause the hit rate to fulfill the requirement, where each additional class should have a non-negligible influence on the hit rate, and with reasonable cache space consumption, it can be determined if and how much should the eviction time be increased.

A more accurate prediction of the influence of incrementing the eviction time and the number of monitored classes can be achieved by taking a statistical sample before applying the full increment. For example, only a fraction, e.g., 10% of cached data that is five hours old will be retained in the cache (exceeding the current eviction time). The statistics of the fifth class can be multiply by ten so as to estimate what would be the results if the fifth class is fully implemented. If the additional hit-rate estimated by the sample for potential additional class(es) is satisfying, then the additional class(es) can be fully employed.

Figure 4:
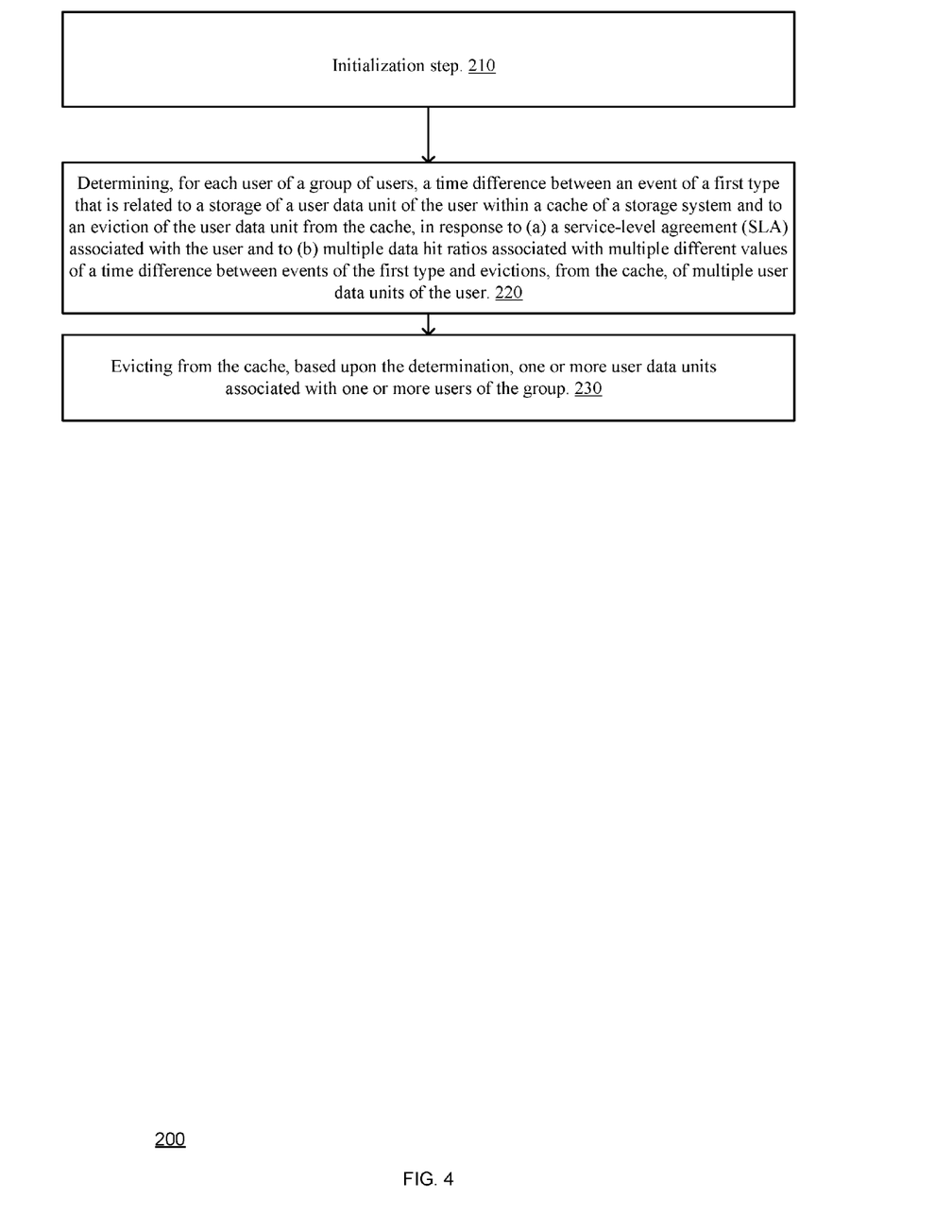
FIG. 4 illustrates a method according to an embodiment of the invention.

FIG. 4 illustrates method 200 according to an embodiment of the invention.

Method 200 may start by initialization step 210.

Initializing step 210 may include at least one of the following steps:

a. Calculating or receiving a mapping between hit ratios and ages of the multiple user data units; wherein an age of a user data unit equals a time difference between writing the user data unit to the cache (or any other event related to the storage of the user data unit in the cache that refreshes the data unit, such as reading the user data from the cache) and an occurrence of a cache hit related to the user data unit.

b. Translating (211) an SLA parameter associated with each user of the group to a desired hit ratio associated with user data units of the user, e.g, the hit ratio that is desired to occur when accessing the data units of the user, so as to satisfy the SLA parameter. The SLA parameter may be associated with each user of the group defines a desired maximal response time or a minimal amount of input output operations per second.

c. Monitoring accesses to user data units associated with a given user of the group. The monitoring may include monitoring the number of read requests from the given user that were served from the cache and the number of user requests served from disk drives and the age of the user data units upon hit occurrence (i.e., upon founding the data in the cache). The monitoring may facilitate the step of calculating of the mapping between hit ratios and ages of the multiple user data units.

d. Calculating, in response to the monitoring, multiple data hit ratios associated with multiple different values of a time difference between events of the first type related to the given user and evictions, from the cache, of multiple user data units of the given user. The calculating may include for example: (i) summing hit ratios of one or more hit ratios of the mapping between hit ratios and ages (e.g., summing bins 11-14 of FIG. 2); (ii) summing extrapolated values of hit ratios of the mapping between hit ratios and ages (e.g., summing bins 15-18 of FIG. 3) (iii) performing several summing (e.g., one sum includes bins 11-14 of FIG. 2 and a second sum includes bins 11-13 of FIG. 2); (iv) comparing one or more sums of hit ratios to the desired hit ratio.

e. Monitoring accesses to user data units associated with a given user of the group at a first granularity.

Method 200 may also include step 220.

Step 220 may be preceded by step 210. Alternatively—step 220 may be executed in parallel to step 210.

Step 220 may include determining, for each user of a group of users, a time difference between an event of a first type that is related to a storage of a user data unit of the user within a cache of a storage system and to an eviction of the user data unit from the cache, in response to (a) a service-level agreement (SLA) associated with the user and to (b) multiple data hit ratios associated with multiple different values of a time difference between events of the first type and evictions, from the cache, of multiple user data units of the user.

The event related to the storage of the user data may be a writing of the user data to the cache. In this case the time difference is a caching period of the user data unit; wherein the caching period of the user data unit equals a difference between a time of writing of the user data unit to the cache and the eviction of the user data unit from the cache.

Alternatively, the event related to the storage of the user data differs from a writing of the user data to the cache, e.g., a request to access the user data, a request to write the user data, etc.

The multiple data hit ratios may be facilitated by the mapping between hit ratios and ages of the multiple user data units. An age of a user data unit equals a time difference between writing the user data unit to the cache and an occurrence of a cache hit related to the user data unit.

Step 220 may be executed in a cyclic manner, in response to events (such as a failure to comply with the SLA of a user, overload of the cache), in a random manner or in a pseudo-random manner. This is illustrated by an arrow that points from 220 to itself.

Step 220 may include at least one of the following steps:

a. Determining to increase the time difference, determining to decrease the time difference or maintain the value of the time difference.

b. Changing the time difference associated with the given user at a second granularity that differs from the first granularity.

c. Decreasing the time difference associated with the given user at the first granularity; and increasing the time difference associated with the given user by a second granularity that is finer than the first granularity.

d. Checking, for a given user of the group, whether the SLA associated with the given user will be maintained when reducing the time difference by a certain amount.

e. Preventing a reduction of the time difference by the certain amount when the SLA associated with the given user will not be maintained after the reduction.

f. Reducing the time difference by the certain amount when the SLA associated with the given user will be maintained after the reduction.

g. Evaluating an increment of the time difference associated with each user of the group when the SLA associated with the user is not maintained.

h. Evaluating an increment of the time difference associated with a given user of the group by increasing the time difference of only a portion of user data units of the given user that are stored in the cache.

Step 220 may be followed by step 230 of evicting from the cache, based upon the determination, one or more user data units associated with one or more users of the group. E.g., evicting a specific user data unit when the time difference that was determined elapses for the specific user data unit event.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method comprising:
determining, for each user of a group of users, a time difference between an event of a first type that is related to a storage of a user data unit of the user within a cache of a storage system and to an eviction of the user data unit from the cache, in response to (a) a service-level agreement (SLA) associated with the user and to (b) multiple data hit ratios associated with multiple different values of a time difference between events of the first type and evictions, from the cache, of multiple user data units of the user; wherein the determining comprises:
checking, for a given user of the group, whether the SLA associated with the given user will be maintained when reducing the time difference;
preventing a reduction of the time difference when the SLA associated with the given user will not be maintained after the reduction; and
reducing the time difference when the SLA associated with the given user will be maintained after the reduction; and
evicting from the cache, based upon the determination, one or more user data units associated with one or more users of the group.

2. The method according to claim 1 wherein the event related to the storage of the user data unit is a writing of the user data unit to the cache; and wherein the time difference is a caching period of the user data unit; wherein the caching period of the user data unit equals a difference between a time of writing of the user data unit to the cache and the eviction of the user data unit from the cache.

3. The method according to claim 2 wherein the multiple data hit ratios are facilitated by a mapping between hit ratios and ages of the multiple user data units; wherein an age of a user data unit equals a time difference between writing the user data unit to the cache and an occurrence of a cache hit related to the user data unit.

4. The method according to claim 1 wherein the event of the first type differs from a writing of the user data unit to the cache.

5. The method according to claim 1 comprising translating an SLA parameter associated with each user of the group to a desired hit ratio associated with user data units of the user.

6. The method according to claim 5 wherein the SLA parameter associated with each user of the group defines a desired maximal response time or a minimal amount of input output operations per second.

7. The method according to claim 1 comprising:
monitoring accesses to user data units associated with a given user of the group; and
calculating, in response to the monitoring, multiple data hit ratios associated with multiple different values of a time difference between events of the first type related to the given user and evictions, from the cache, of multiple user data units of the given user.

8. The method according to claim 1 comprising monitoring accesses to user data units associated with a given user of the group at a first granularity.

9. The method according to claim 8 comprising changing the time difference associated with the given user at a second granularity that differs from the first granularity.

10. The method according to claim 8 comprising decreasing the time difference associated with the given user at the first granularity; and increasing the time difference associated with the given user by a second granularity that is finer than the first granularity.

11. The method according to claim 1 wherein the determining further comprises evaluating an increment of the time difference associated with each user of the group when the SLA associated with the user is not maintained.

12. The method according to claim 1 wherein the determining further comprises evaluating an increment of the time difference associated with a given user of the group by increasing the time difference of only a portion of user data units of the given user that are stored in the cache.

13. A non-transitory computer readable medium that stores instructions that once executed by a storage system cause the storage system to execute the steps of: determining, for each user of a group of users, a time difference between an event of a first type that is related to a storage of a user data unit of the user within a cache of a storage system and to an eviction of the user data unit from the cache, in response to (a) a service-level agreement (SLA) associated with the user and to (b) multiple data hit ratios associated with multiple different values of a time difference between events of the first type and evictions, from the cache, of multiple user data units of the user; and evicting from the cache, based upon the determination, one or more user data units associated with one or more users of the group; wherein the determining comprises: checking, for a given user of the group, whether the SLA associated with the given user will be maintained when reducing the time difference; preventing a reduction of the time difference when the SLA associated with the given user will not be maintained after the reduction; and reducing the time difference when the SLA associated with the given user will be maintained after the reduction.

14. The non-transitory computer readable medium according to claim 13 wherein the event related to the storage of the user data unit is a writing of the user data unit to the cache; and wherein the time difference is a caching period of the user data unit; wherein the caching period of the user data unit equals a difference between a time of writing of the user data unit to the cache and the eviction of the user data unit from the cache.

15. The non-transitory computer readable medium according to claim 14 wherein the multiple data hit ratios are facilitated by a mapping between hit ratios and ages of the multiple user data units; wherein an age of a user data unit equals a time difference between writing the user data unit to the cache and an occurrence of a cache hit related to the user data unit.

16. The non-transitory computer readable medium according to claim 13 wherein the event of the first type differs from a writing of the user data unit to the cache.

17. The non-transitory computer readable medium according to claim 13 that stores instructions for translating an SLA parameter associated with each user of the group to a desired hit ratio associated with user data units of the user.

18. The non-transitory computer readable medium according to claim 17 wherein the SLA parameter associated with each user of the group defines a desired maximal response time or a minimal amount of input output operations per second.

19. The non-transitory computer readable medium according to claim 13 that stores instructions for monitoring accesses to user data units associated with a given user of the group; and calculating, in response to the monitoring, multiple data hit ratios associated with multiple different values of a time difference between events of the first type related to the given user and evictions, from the cache, of multiple user data units of the given user.

20. The non-transitory computer readable medium according to claim 13 that stores instructions for monitoring accesses to user data units associated with a given user of the group at a first granularity.

21. The non-transitory computer readable medium according to claim 20 that stores instructions for changing the time difference associated with the given user at a second granularity that differs from the first granularity.

22. The non-transitory computer readable medium according to claim 21 that stores instructions for decreasing the time difference associated with the given user at the first granularity; and increasing the time difference associated with the given user by a second granularity that is finer than the first granularity.

23. The non-transitory computer readable medium according to claim 13 wherein the determining further comprises evaluating an increment of the time difference associated with each user of the group when the SLA associated with the user is not maintained.

24. The non-transitory computer readable medium according to claim 13 wherein the determining further comprises evaluating an increment of the time difference associated with a given user of the group by increasing the time difference of only a portion of user data units of the given user that are stored in the cache.

* * * * *